United States Patent
Bulgajewski et al.

(10) Patent No.: US 10,209,512 B2
(45) Date of Patent: Feb. 19, 2019

(54) CAMERA HEATER FOR ADVANCED DRIVER ASSISTANCE SYSTEM

(71) Applicant: ILLINOIS TOOL WORKS INC., Glenview, IL (US)

(72) Inventors: Edward Bulgajewski, Genoa, IL (US); Michael Cubon, Park Ridge, IL (US); Piotr Silwa, Mt. Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/553,454

(22) PCT Filed: Mar. 24, 2016

(86) PCT No.: PCT/US2016/023865
§ 371 (c)(1),
(2) Date: Aug. 24, 2017

(87) PCT Pub. No.: WO2016/164173
PCT Pub. Date: Oct. 13, 2016

(65) Prior Publication Data
US 2018/0017785 A1   Jan. 18, 2018

Related U.S. Application Data

(60) Provisional application No. 62/144,541, filed on Apr. 8, 2015.

(51) Int. Cl.
| | |
|---|---|
| *G02B 7/18* | (2006.01) |
| *G02B 27/00* | (2006.01) |
| *G03B 17/55* | (2006.01) |
| *H04N 5/225* | (2006.01) |
| *B60R 11/04* | (2006.01) |
| *H05B 3/84* | (2006.01) |

(Continued)

(52) U.S. Cl.
CPC .......... *G02B 27/0006* (2013.01); *B60R 11/04* (2013.01); *G02B 1/18* (2015.01); *G03B 17/55* (2013.01); *H04N 5/2252* (2013.01); *H05B 3/58* (2013.01); *H05B 3/84* (2013.01)

(58) Field of Classification Search
CPC .... G02B 27/0006; G02B 27/00; G03B 17/55; H04N 5/2252; H04N 5/225
USPC .................................................. 359/507, 512
See application file for complete search history.

(56) References Cited

U.S. PATENT DOCUMENTS 7,965,336 B2 * 6/2011 Bingle .................... B60R 11/04
348/374
2011/0249120 A1  10/2011 Bingle et al.

(Continued)

OTHER PUBLICATIONS

International Search Report for Application PCT/US2016/023865; dated Jun. 3, 2016.

*Primary Examiner* — Euncha P Cherry
(74) *Attorney, Agent, or Firm* — Jospeh M. Butscher; The Small Patent Law Group, LLC

(57) ABSTRACT

A heater system for resisting fog and ice buildup on advanced driver assistance cameras provides a chamber covering the camera lens and providing a transparent window through which the camera lens may be directed. A heating element communicates with an air gap between the lens and the transparent window and the periphery of the transparent window to provide heating of the transparent window without blocking an image received by the camera lens.

20 Claims, 1 Drawing Sheet

(51) Int. Cl.
*G02B 1/18* (2015.01)
*H05B 3/58* (2006.01)

(56) References Cited

U.S. PATENT DOCUMENTS

2012/0170119 A1    7/2012  Chu et al.
2012/0243093 A1*   9/2012  Tonar ................. G02B 27/0006
                                               359/507

* cited by examiner

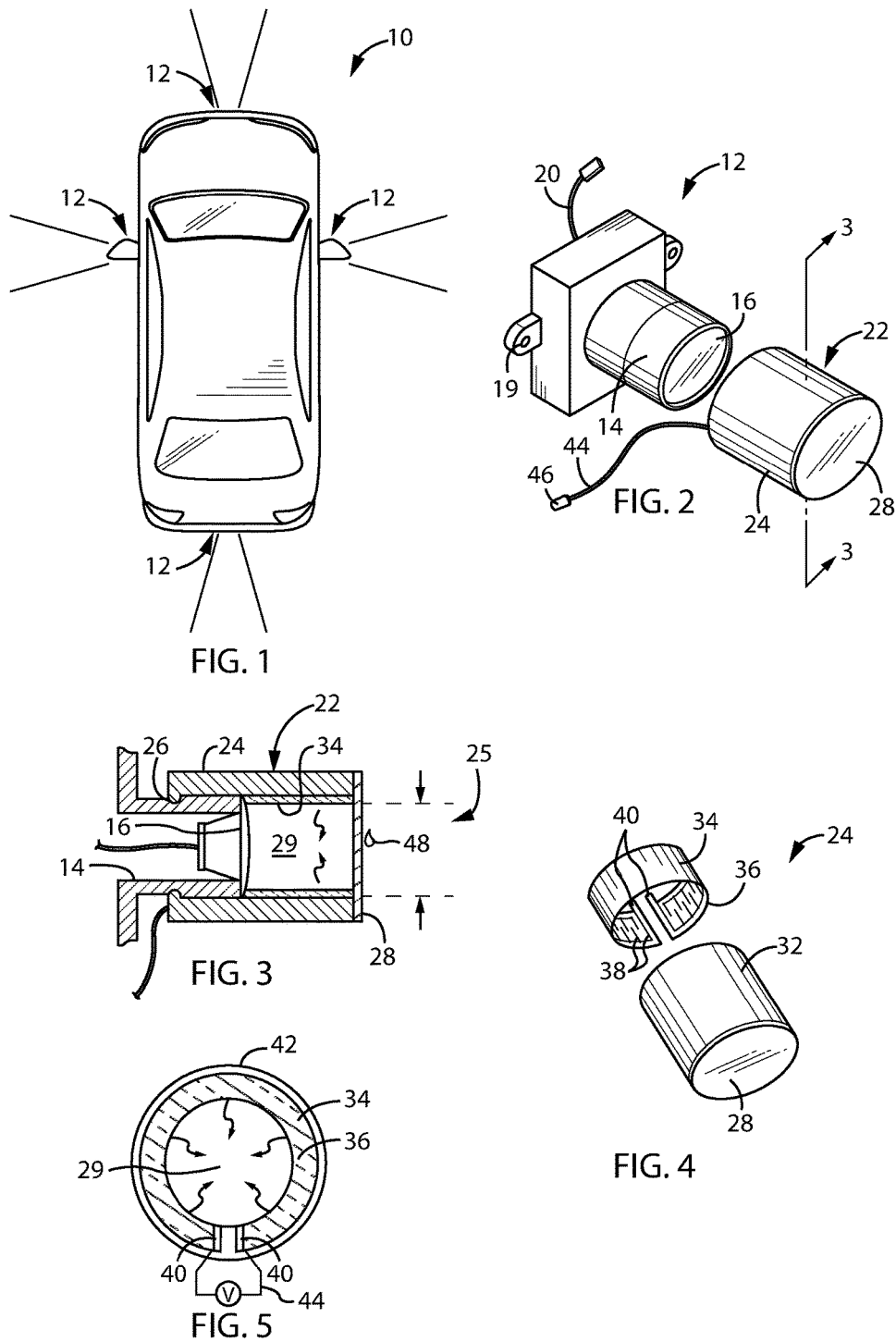

CAMERA HEATER FOR ADVANCED DRIVER ASSISTANCE SYSTEM

CROSS-REFERENCE TO RELATED APPLICATION

This application claims the benefit of U.S. provisional application 62/144,541 filed Apr. 8, 2015 and hereby incorporated by reference in its entirety.

FIELD OF THE INVENTION

The present invention relates generally to vehicular systems for advanced driver assistance systems (ADAS) and the like and, in particular, to a heater system for allowing operation of imaging cameras outside of the vehicle during adverse weather conditions.

BACKGROUND OF THE INVENTION

Advanced Driver Assistance Systems (ADAS), such as those that provide assistance to the driver in guiding a vehicle, may employ multiple electronic cameras positioned to monitor the environment of the vehicle. For example, an automotive surround view camera system can provide the driver with a 360-degree view of the area surrounding the vehicle using four to six cameras mounted around the vehicle facing different directions. Similar camera systems may be used for lane departure warning systems, pedestrian avoidance systems, blind spot monitors, automatic parking, and the like.

The positioning of these cameras for proper function may leave them susceptible to image degradation from frost, ice, fog, and water spray.

SUMMARY OF THE INVENTION

The present invention provides a "lens cap" heater that may attach to the camera over the camera lens to provide a heated assembly that repels and dissipates liquid and frozen water that can degrade the images provided by the camera. In one embodiment, the assembly provides a housing having a self-contained heating element supporting a water repelling transparent window. The heater applies heat to the window area without blocking the window area by heating a small air volume in the vicinity of the window such as transfers heat to the window without blocking the lens. The heater may employ a polymer positive temperature coefficient (PTC) material that provides automatic temperature regulation simplifying control of the heater.

Specifically, the invention provides a heater for an advanced driver assistance camera having a housing with a first opening sized to receive a lens of the advanced driver assistance camera therethrough into a housing volume and a second opening providing a transparent window area through which the driver assistance camera may receive an image when the lens is positioned in the housing volume. A heater element is in the housing outside of the transparent window area to heat the transparent window area by at least one of conduction and convection.

It is thus a feature of at least one embodiment of the invention to provide a heater system that may work with a variety of different advanced driver assistance cameras to harden those cameras against obstructing fog and ice.

The transparent window may be treated with a hydrophobic material.

It is thus a feature of at least one embodiment of the invention to promote the shedding of liquid water to augment the effectiveness of the heater.

The first opening may conform to a size of the lens to support the housing with respect to the camera.

It is thus a feature of at least one embodiment of the invention to provide a "lens cap" type design easily installed and replaced on a camera.

The heater housing may be substantially cylindrical.

It is thus a feature of at least one embodiment of the invention to provide a lightweight heater assembly minimizing opportunities for water ingress.

The heater element may be a flexible polymer sheet.

It is thus a feature of at least one embodiment of the invention to provide a heater element that can be readily adapted to attach to various surfaces of the housing.

The heater element may be attached to the housing by adhesive.

It is thus a feature of at least one embodiment of the invention to provide a heater element that can be adapted to work with separately fabricated injection molded components.

The heater element may be a positive temperature coefficient material.

It is thus a feature of at least one embodiment of the invention to provide temperature regulation in a robust, vibration resistant form eliminating bimetallic thermostatic elements and the like.

The heater may include a voltage source for applying a current through the heater element to heat the transparent window area to a temperature preventing accumulation of ice and fog.

It is thus a feature of at least one embodiment of the invention to provide a heater element that may practically melt frozen water and dissipate fog.

The housing may retain the lens to provide an air gap between the lens and the transparent window area exposed to the heater to heat the air in the air gap thereby conducting heat from the heater to the transparent window.

It is thus a feature of at least one embodiment of the invention to avoid the need for direct heating of the camera lens to remove ice or fog from the camera lens such as may be resisted by problems of accessibility of the camera lens to heating elements and high thermal resistance of the camera lens material.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a top plan view of an automobile showing example camera locations and fields of view for those cameras as used for an advanced driver assistance system;

FIG. 2 is an exploded perspective view of one camera of FIG. 1 and a lens cover heater system of the present invention;

FIG. 3 is a cross-sectional view taken along line 3-3 of FIG. 2 showing the components of the lens cover heater system including a cylindrical heater element and transparent window element;

FIG. 4 is an exploded perspective view of the lens cover heater system in a first embodiment having an applied heater element; and FIG. 5 is a cross-sectional view perpendicular to that of FIG. 3 showing a second embodiment of the invention employing an overmolded positive temperature coefficient material.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, a vehicle 10 may provide for multiple cameras 12, for example, CCD cameras for implementing an automotive surround view camera system each having a field of view directed away from the center of the vehicle 10 to provide for 360-degrees of imaging. These cameras 12 may be exposed to environmental contamination, for example, when mounted at positions exposed through the body of the vehicle 10 or, for example, on wing mirrors.

Referring now to FIG. 2, the cameras 12 may provide a cylindrical lens barrel 14 supporting a lens 16 for collecting light in the production of an image. The rear base of the lens barrel 14 may attach to a camera body 18 including circuitry for processing of the received image and providing a harness assembly 20 for communicating high-speed image data from the camera 12, for example, through a serial port communication protocol. Camera body 18 may further include mounts 19 for attaching the camera body to the vehicle 10 with the lens 16 facing outward therefrom into the environment around the vehicle 10.

Referring now to FIGS. 2 and 3, a lens cover heater 22 per the present invention may provide for a cylindrical sleeve 24 sized to provide an internal diameter that fits tightly over the external diameter of the lens barrel 14 so that the cylindrical sleeve 24 may slide over the lens barrel 14 to cover a proximal end of the lens barrel 14. The cylindrical sleeve 24, for example, may be made of a molded thermoplastic material of low heat conductivity and may desirably be opaque to provide for resistance to off-axis light. Teeth or detent surfaces 26 may extend inward from a rear lip of the cylindrical sleeve 24 to retain the sleeve in proper position with respect to a groove in the lens barrel 14, or an adhesive or other fastening mechanism may be provided to retain the cylindrical sleeve 24 in position on the lens barrel 14. A front base of the cylindrical sleeve 24 is covered by a disk-shaped transparent window 28 and sealed at its periphery to the cylindrical sleeve so that the lens cover heater 22 provides a sealed volume 29 in front of the lens 16 (when installed on the lens barrel 14) protecting the lens 16 from direct environmental contact. A portion of the disk-shaped transparent window 28 inside the cylindrical sleeve 24 (thus unobstructed) defines a transparent window area 25. The transparent window 28 may be a transparent thermoplastic material or glass sealed to one end of the cylindrical sleeve 24 to prevent the ingress of water at the interface between the transparent window 28 and cylindrical sleeve 24. Desirably, the transparent window 28 has a thermal resistance and thickness such as to conduct heat readily through its surface from the volume 29 to the outer surface of the transparent window 28. In this regard, the transparent window 28 may be a thermoplastic having a thickness of less than 1/16 inch or a glass having a thickness of less than 1/8 inch.

A front surface of the transparent window 28 may be treated with a hydrophobic material such as a silicone material or textured with a nanoscopic surface or coated with a similar material to repel water while remaining optically clear.

Referring now to FIG. 4, the cylindrical sleeve 24 may provide for tubular element 32 fitting tightly against the lens barrel 14 and adhered to or in-molded with a generally planar transparent window 28. The tubular element 32 may attach to a flexible heater band 34, for example, which may fit against the inner wall of the tubular element 32 and which may provide an inner coating, or be formed, of a positive temperature coefficient material 36.

In one embodiment, the positive temperature coefficient material 36 may provide a flexible polymer sheet that may flex or roll to readily conform to the inner surface of the tubular element 32.

Electrodes 38 may be applied in contact with the positive temperature coefficient material 36 and may communicate with terminals 40 so that electricity (typically 12 volts) can be passed through the electrodes 38 and then through the positive temperature coefficient material 36. The positive temperature coefficient material 36 may provide at least 0.25 watts per square inch of heater area and optionally more than two watts per square inch of heater area. The positive temperature coefficient materials 36 may be adapted to provide at least 0.75 watts per square inch of transparent window area 25 and preferably more than 1.25 watts per square inch of transparent window area.

The flexible heater band 34 may, for example, be adhered to the outside or inside circumference of the tubular element 32 using an adhesive or pressure-sensitive tape or film or may be in-molded to the cylindrical element 32 during an injection molding process.

A positive temperature coefficient of resistance causes the amount of electrical flow through the material to vary according to the temperature of the material, with increased electrical flow at lower temperatures and decreased electrical flow at higher temperatures. This property provides for a self-regulating temperature of the flexible heater band 34 when a substantially constant voltage source is applied across the positive temperature coefficient material 36. Positive temperature coefficient (PTC) heaters, suitable for the present invention, are also disclosed in U.S. Pat. Nos. 4,857,711 and 4,931,627 to Leslie M. Watts hereby incorporated in their entirety by reference. Alternatively or in addition, the flexible heater band 34 may be provided with a pulse width modulated voltage providing either a constant average voltage or an average voltage that varies according to a feedback signal such as the temperature signal or the like.

Electrodes 38 may be, for example, screenprinted using conductive metallic inks or vapor deposited, for example, of silver, aluminum or the like or applied as a thin decal or etched from an adhered film using integrated circuit techniques or a variety of other manufacturing processes.

As positioned on the camera 12 and held on the camera 12, for example, through detent surfaces 26 described above, the front surface of the lens 16 is spaced away from a rear surface of the transparent window 28 to provide an air volume 29 therebetween. This air volume 29 is sized to allow conduction of heat from the heater band 34 to the entire surface of the transparent window 28 over the transparent window area 25. The heater band 34 may thus heat the transparent window area 25 by convection as well as by edgewise heat conduction through the periphery of the transparent window 28 proximate to the heater band 34.

Referring now to FIG. 5, in an alternative embodiment, terminals 40 may attach to a solid molded split-tube of positive temperature coefficient material 36 on opposite sides of the split so that electricity must be conducted through the circumference of the positive temperature coefficient material 36. Positive temperature coefficient material 36 may be overmolded with an outer insulating layer 42 which also provides an insulating separator between the terminals 40 within the split.

Generally inwardly directed heat generated by the positive temperature coefficient material 36 in any of these embodiments will be concentrated in the volume 29 to heat the transparent window 28, thereby allowing the transparent window 28 to resist the buildup of fog, ice, or snow on the outer surface of that window. The hydrophobic or super hydrophobic outer surface of the window 28 will generally also shed liquid water 48 from the outer surface of the transparent window 28.

Conductive leads 44 may attach to the terminals 40 and lead to an electrical connector 46 (shown in FIG. 2) that can be connected to an automotive harness to provide power thereto from a voltage source such as a car automotive system.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A heater system for an advanced driver assistance camera comprising:
   a lens cover heater including a first opening sized to receive a lens of the advanced driver assistance camera therethrough into a volume and a second opening having a transparent window adapted to allow the driver assistance camera to receive an image when the lens is positioned in the volume, the lens and the transparent window separated along an axis, the lens cover heater further including an axially extending wall extending to the transparent window and configured to extend to the lens of the advanced drive assistance camera; and
   a heater element attached to extend along the axially extending wall outside of the transparent window to heat the transparent window by at least one of conduction and convection.

2. The heater system of claim 1 wherein the outer surface of the transparent window is treated with a hydrophobic material.

3. The heater system of claim 2 wherein the hydrophobic material is a silicone material.

4. The heater of claim 1 wherein the first opening conforms to a size of the lens to support the lens cover heater with respect to the camera.

5. The heater system of claim 4 wherein the lens cover heater is substantially cylindrical.

6. The heater system of claim 1 wherein the heater element is a flexible polymer sheet.

7. The heater system of claim 6 wherein the heater element is attached to the lens cover heater by adhesive.

8. The heater system of claim 1 wherein the heater element is a positive temperature coefficient material.

9. The heater system of claim 1 further including a voltage source for applying a current through the heater element to heat the transparent window to a temperature preventing accumulation of ice and fog.

10. The heater system of claim 1 wherein the lens cover heater is configured to retain the lens to provide an air gap between the lens and the transparent window exposed to the heater to heat the air in the air gap thereby conducting heat from the heater to the transparent window.

11. The heater system of claim 1 further including the advanced driver assistance camera, wherein the advanced driver assistance camera includes a mounting for mounting to a vehicle to be directed outward from the vehicle for viewing an environment of the vehicle.

12. A method of providing visibility to an advanced driver assistance camera mounted on a vehicle comprising:
   (a) installing a lens cover heater over a lens of an advanced driver assistance camera, the lens cover heater having a first opening into a volume and sized to receive the lens of the advanced driver assistance camera and a second opening displaced along an axis from the first opening providing a transparent window adapted to allow the driver assistance camera to receive an image when the lens is positioned in the volume, and a heater element attached to an axially extending wall and extending along the axially extending wall outside of the transparent window to heat the transparent window by at least one of conduction and convection; and
   (b) passing current through the heater element to heat the transparent window to free the transparent window of obstruction from at least one of fog and ice.

13. The method of claim 12 wherein outer surface of the transparent window is treated with a hydrophobic material.

14. The method of claim 12 wherein the heater element is a positive temperature coefficient material when the current is at a substantially constant voltage when on.

15. The method of claim 12 wherein the lens cover heater retains the lens to provide an air gap between the lens and the transparent window exposed to the heater to heat the air in the air gap thereby conducting heat from the heater to the transparent window and providing a primary heat transfer path between the heater and a center of the transparent window area.

16. The heater system of claim 1, wherein the heater element comprises a rolled heater band that conforms to an inner surface of the axially extending wall.

17. The heater system of claim 1, wherein the heater element does not block the transparent window.

18. The heater system of claim 1, wherein the heater element does not contact the transparent window.

19. The method of claim 12, wherein the heater element comprises a rolled heater band that conforms to an inner surface of the axially extending wall.

20. The method of claim 12, wherein the heater element does not contact the transparent window.

\* \* \* \* \*